Oct. 13, 1959     J. J. DUDDY     2,908,811
SERVICE LAMP

Filed June 12, 1957

INVENTOR.
JAMES J. DUDDY
BY
ATTORNEY

United States Patent Office 2,908,811
Patented Oct. 13, 1959

2,908,811

SERVICE LAMP

James J. Duddy, York, Pa.

Application June 12, 1957, Serial No. 665,319

3 Claims. (Cl. 240—52.1)

This invention relates to improvements in a service lamp and, more particularly, to a service lamp especially adapted for use by garage mechanics. However, while the lamp is especially adapted for such purposes, the invention is not to be regarded as restricted entirely to such use since the lamp may be used in other capacities.

It is conventional practice in garages particularly to use so-called trouble lights which merely comprise an electric light socket connected to the end of a flexible electrical conduit, and usually a wire guard is mounted upon the electric light socket so as to enclose the lamp bulb and protect the same. However, there are many situations which occur in a garage wherein it is difficult to position a lamp of this type so as suitably to illuminate a particular object or location upon an automobile for example. On occasions, a wire hook is used in connection with such trouble light to hang the light upon a suitable object as conveniently as possible when working upon automobiles but even this type of supporting means is not satisfactory to desirably position such a light under all circumstances.

It is the principal object of the present invention to provide a service light, and particularly an automobile service light, which may be adjustably positioned to reflect illumination directly upon any object or area desired, as required, when working upon an automobile or the like in a garage or otherwise, regardless of whether it is desired to position the light so as to be supported from the floor, any suitable supporting surface upon the vehicle, or from the top of the radiator of the vehicle, especially when working upon the engine of the vehicle.

A further object of the invention is to provide in the lamp construction connecting means by which a lamp assembly may be detachably connected to a number of different types of supporting bases or members, thereby providing a service light of extensive universal positioning possibilities.

A still further object of the invention is to provide an adjustable service light which is rugged and durable, yet may be manufactured for a minimum cost due to the simple nature of the construction and ease of assembly.

Details of the foregoing objects and of the invention, as well as other objects thereof, are set forth in the following specification and illustrated in the drawing comprising a part thereof.

Figure 1:
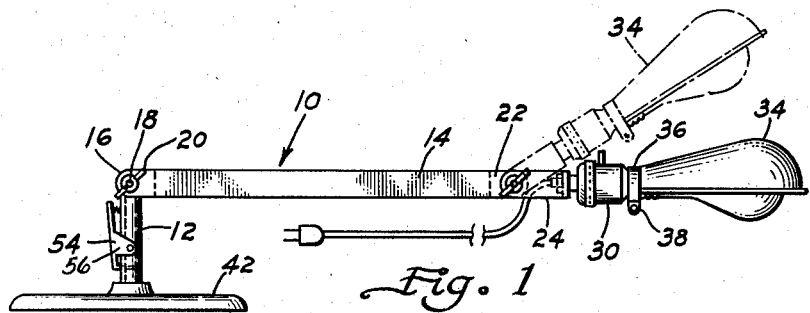
Fig. 1 is a side elevation of a service lamp embodying the principles of the present invention and illustrated as being supported upon a horizontal surface by a suitable base.
Figures 2, 3:
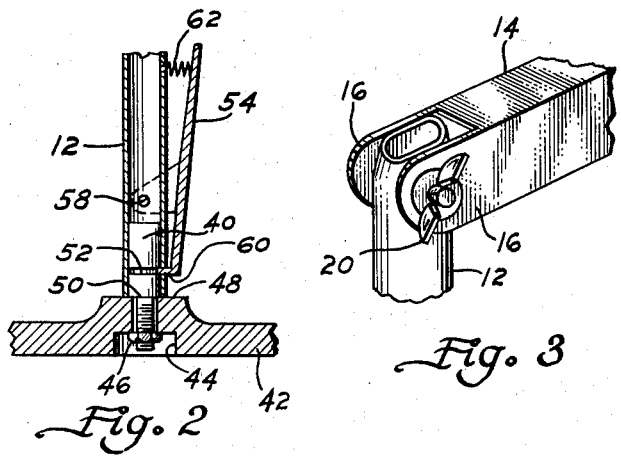
Fig. 2 is a fragmentary, vertical sectional view, on a larger scale than used in Fig. 1, illustrating details by which the lamp assembly is detachably and adjustably secured to a base of the type shown in Fig. 1.
Fig. 3 is a fragmentary, perspective view illustrating a portion of the lamp assembly on a scale still larger than that used in Fig. 2.

Referring to Figs. 1 and 2 particularly, the service lamp 10 comprises a tubular socket member 12 and an extension arm 14 which are adjustably connected. In the preferred embodiment of the invention, the extension arm 14 may be formed from hollow tubing which preferably is square in cross-section, although the same may be cylindrical if desired, and portions of the tube stock are cut out in order to provide a pair of ears 16. Said ears and the upper end of the socket member 12 are apertured in transverse alignment to accommodate a pivot bolt 18 which extends through said apertures, one end of the bolt having a wing nut 20 threaded thereon. The inner surfaces of the ears 16 closely and slidably engage the exterior of the socket member 12, whereby when the thumb nut 20 is tightened, the desired position between extension arm 14 and socket member 12 is maintained.

The opposite end of extension arm 14 is similarly formed to provide pairs of ears 22 and a preferably U-shaped bracket 24 is adjustably and pivotally connected to the ears 22 by means of a pivot bolt 26 which extends through transversely aligned apertures in the bracket 24 and ears 22. A wing nut 28 is threaded on the pivot bolt 26. The inner surfaces of the legs of bracket 24 closely and slidably engage preferably the outer surfaces of ears 22, whereby when the wing nut 28 is tightened, the bracket 24 is secured to the outer end of extension arm 14 in any desired position, several of which are illustrated respectively in full and dotted lines in Fig. 1.

A conventional electric light bulb socket 30 is fixed by a nut 32, or otherwise, to the bracket 24. Also, a suitable reflector 34 is connected to the socket 30 by a suitable clamping band 36 provided with ears 38 which may be clamped together by a suitable screw to hold the reflector 34 attached to the socket 30. However, it is preferred that the reflector 34 be adjustable axially of the socket 30, engaging the socket frictionally for example, whereby the reflector may be adjusted to any desired axial position relative to the socket 30.

A supporting post 40, which is complementary to the interior of the socket member 12 is insertable within the lower end of the socket member 12 to support the lamp assembly relative to a suitable base 42. In the embodiment shown in Figs. 1 and 2, the base preferably is formed from suitable metal so as to provide sufficient weight to support the lamp assembly even when extended in the position shown in Fig. 1 for example. A cast iron base 42 is highly suitable for this purpose, the lower surface thereof having a socket 44 therein within which a nut 46 is accommodated when threaded onto the lower end 48 of post 40 which is of a smaller diameter than the upper portion of post 40 so as to provide an annular shoulder 50 which abuts an upper surface of the base 42.

The post 40 and socket member 12 are provided with interengaging, quickly operable, manually actuated locking means which, in the preferred embodiment of the invention, comprise an annular groove 52 formed in post 40, and a pivoted detent or latch member 54 having ears 56 which embrace opposite surfaces of socket member 12 and are pivotally connected thereto by a rivet 58. The lower end of member 54 has an inwardly projecting detent 60 which extends through a suitable opening in the wall of socket member 12 so as to be disposable within the annular groove 52 of post 40. The opposite end of member 54 comprises a finger engageable blade which normally is held in spaced position from socket member 12 by a compression spring 62.

When the detent or latch member 54 is in the position shown in Fig. 2, the detent 60 will engage annular groove 52 of the post 40 and thereby detachably but securely connect the socket member 12 and lamp assembly to the base 42, while affording relative pivotal movement of the socket member 12 about the axis of post 40, whereby the lamp readily may be moved in this manner to any desired position as, for example, when the base 42 is mounted upon a garage floor, a fender, a floor of a vehicle, or otherwise. In addition, the extension arm 14 may be pivotally adjusted relative to the upper end of socket member 12, while the lamp which is supported by bracket 24 likewise may be pivotally adjustable in opposite directions relative to the outer end of extension arm 14.

Figure 5:
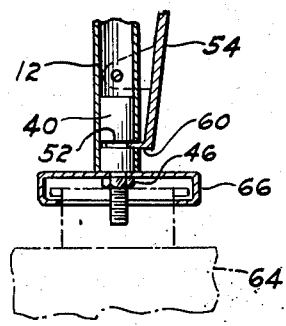
Fig. 5 is a view similar to Fig. 2 but showing the lamp assembly secured to a different type of supporting base comprising a cap connectable to the inlet of a conventional automobile radiator.
Figure 4:
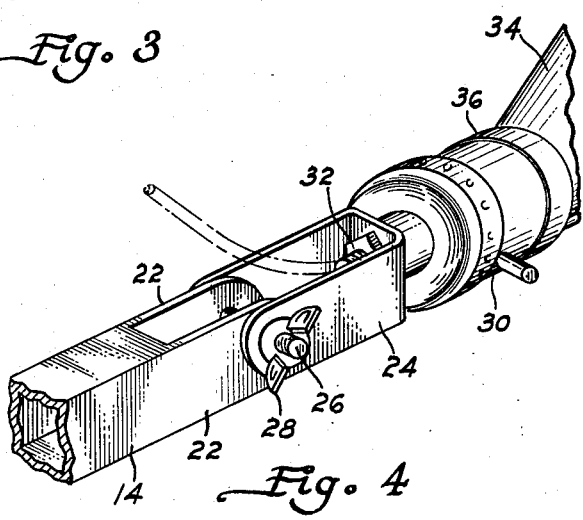
Fig. 4 is another perspective view showing another portion of the lamp assembly on the same scale as in Fig. 3.

Under certain circumstances, especially when working upon the engine of a vehicle, it is desirable that the lamp assembly be supported so as to reflect light into the engine compartment. Under such circumstances, it is convenient to support such a lamp from the radiator 64, which is shown in phantom in Fig. 5. The upper inlet of the radiator normally is closed by a conventional radiator cap 66 and such a cap may be used as a base for the post 40, as clearly shown in Fig. 5. When the lamp is merchandised for example, an extra post 40, connected to a conventional raidator cap 66, can be sold with the lamp assembly which otherwise is provided with the base 42 to which a post 40 also is connected.

When it is desired to mount the lamp assembly comprising socket member 12, extension arm 14, and the lamp on bracket 24, upon the radiator cap 66 for example, it simply is necessary to manually actuate the latch member 54 to release the detent 60 from the groove 52, whereupon the assembly just described quickly may be removed from the base 42 and post 40, and thereby will be in condition to be mounted upon the post 40 on radiator cap 66. Upon releasing the latch member 54, the spring 62 will press the detent 60 into the groove 52 of the post 40 on radiator cap 66, thereby securing detachably the lamp assembly to the radiator cap. The various components of the lamp assembly then may be adjusted suitably relative to the radiator cap so as to reflect light upon any desired item or location within the engine compartment, front of the radiator, or otherwise.

From the foregoing, it will be seen that the present invention provides a service lamp especially adapted for garage use but which also may be used in many other capacities, especially when the base 42 is connected to the lamp assembly. A wide range of latitude in adjustment of the various components of the lamp assembly is afforded relative to whichever base the assembly is mounted upon, such adjustment being achieved by pivoting the bracket 24 relative to the extension arm 14 and the extension arm relative to the socket member 12, the reflector 34 also being adjustable axially upon the lamp socket 30. By providing this type of adjustability, substantially any item or location upon a vehicle, for example, may be illuminated by said lamp without requiring the use of any additional supporting means other than either the base 42 or the radiator cap 66. Further, the simplicity of construction of the entire assembly is such that it may be produced for a minimum of cost, yet is rugged and durable and capable of long life.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A service lamp assembly comprising in combination, a tubular socket member, an extension arm, means pivotally connecting one end of said socket member to one end of said arm, a bracket pivotally connected to the other end of said extension arm, an electric light bulb socket fixed to said bracket, a relatively short supporting post complementary in shape to the interior of but having a portion shorter than said tubular socket member and having notch means intermediate the ends thereof, said socket member detachably and telescopically fitting said portion of said post and normally being mounted thereon, a base connected to one end of said post and the other end of said socket member abutting said base when positioned operatively upon said post, and quickly operable latching means having a detent engageable with said notch means on said portion of said post when said socket member is positioned operatively upon said post as aforesaid and operable to secure said socket member detachably to said post, whereby said assembled extension arm and electric light bulb socket normally may be pivotally adjusted relative to each other and said tubular socket member, said last mentioned assembled members being quickly detachable from said base and post for mounting of the same quickly upon another base having a similar post connected thereto.

2. A service lamp assembly comprising in combination, a tubular socket member, an extension arm, means pivotally connecting one end of said socket member to one end of said arm, a bracket pivotally connected to the other end of said extension arm, an electric light bulb socket fixed to said bracket, a relatively short supporting post complementary in shape to the interior of but shorter than said tubular socket member and having an annular groove therein intermediately of the ends thereof, said socket member detachably and telescopically fitting said post and normally being mounted thereon, a base connected to one end of said post and the other end of said socket member abutting said base when positioned operatively upon said post, and quickly operable latching means comprising a latch having a detent pivotally carried by said socket member and extending through an opening therein to engage said annular groove in said post intermediately of the ends thereof to secure said socket member detachably connected to said post when said socket member is positioned operatively upon said post as aforesaid, whereby said assembled extension arm and electric light bulb socket may be pivotally adjusted relative to each other and said tubular socket member, said last mentioned assembled members being quickly detachable from said base and post for mounting of the same quickly upon another base having a similar post connected thereto.

3. A service lamp assembly comprising in combination, a tubular socket member, an extension arm, means pivotally connecting one end of said socket member to one end of said arm, a bracket pivotally connected to the other end of said extension arm, an electric light bulb socket fixed to said bracket, a relatively short supporting post complementary in shape to the interior of but shorter than said tubular socket member and having one end reduced in diameter to provide an annular positioning shoulder and exteriorly threaded, said post also having an annular groove positioned intermediately of the ends thereof and said socket member detachably and telescopically fitting said post and normally being mounted thereon in predetermined position, a base having a hole therein receiving said threaded end of said post with said positioning shoulder abutting the top of said base to space said groove in said post a predetermined distance above said base and the outer end of said socket member abutting the upper surface of said base when said socket member is mounted upon said post, a nut threaded onto said threaded end of said post against said base, and quickly operable interengageable manually actuated latching means on said socket member having a detent operable to engage said groove on said post to secure said socket member detachably to said post, whereby said assembled extension arm and electric light bulb socket may be pivotally adjusted relative to each other and said tubular socket member, said last mentioned assembled members being quickly detachable from said base and post for mounting of the same quickly upon another base having a similar post connected thereto.

References Cited in the file of this patent

UNITED STATES PATENTS

| | | |
|---|---|---|
| D. 135,479 | Hopkins | Apr. 13, 1943 |
| 842,717 | Smith | Jan. 29, 1907 |
| 971,899 | Kennedy | Oct. 4, 1910 |
| 2,204,508 | Matthies | June 11, 1940 |
| 2,220,215 | Cloutier | Nov. 5, 1940 |